United States Patent [19]

Ballendux

[11] 4,025,136
[45] May 24, 1977

[54] MULTIPLE BEARING ADJUSTING DEVICE

[75] Inventor: Gerardus M. Ballendux, Waukesha, Wis.

[73] Assignee: Allis-Chalmers Corporation, Milwaukee, Wis.

[22] Filed: Nov. 3, 1975

[21] Appl. No.: 628,524

[52] U.S. Cl. .......................................... 308/207 A
[51] Int. Cl.² ...................................... F16C 13/00
[58] Field of Search ............... 308/1 R, 8, 15, 151, 308/174, 176, 189 R, 189 A, 194, 202, 207 R, 207 A, 195

[56] References Cited

UNITED STATES PATENTS

| 1,141,201 | 6/1915 | Munson | 308/176 |
| 1,832,312 | 11/1931 | Lutz | 308/176 |
| 2,718,193 | 9/1955 | Zimsky | 308/176 |
| 3,620,586 | 11/1971 | Maastricht | 308/207 A |

*Primary Examiner*—Joseph F. Peters, Jr.
*Assistant Examiner*—Richard A. Bertsch
*Attorney, Agent, or Firm*—Arthur L. Nelson

[57] ABSTRACT

A means for adjusting a plurality of bearings rotatably supporting a plurality of rotating elements by controlling the axial dimension on the rotating elements and bearing supports to allow one adjustment to align all bearings.

10 Claims, 1 Drawing Figure

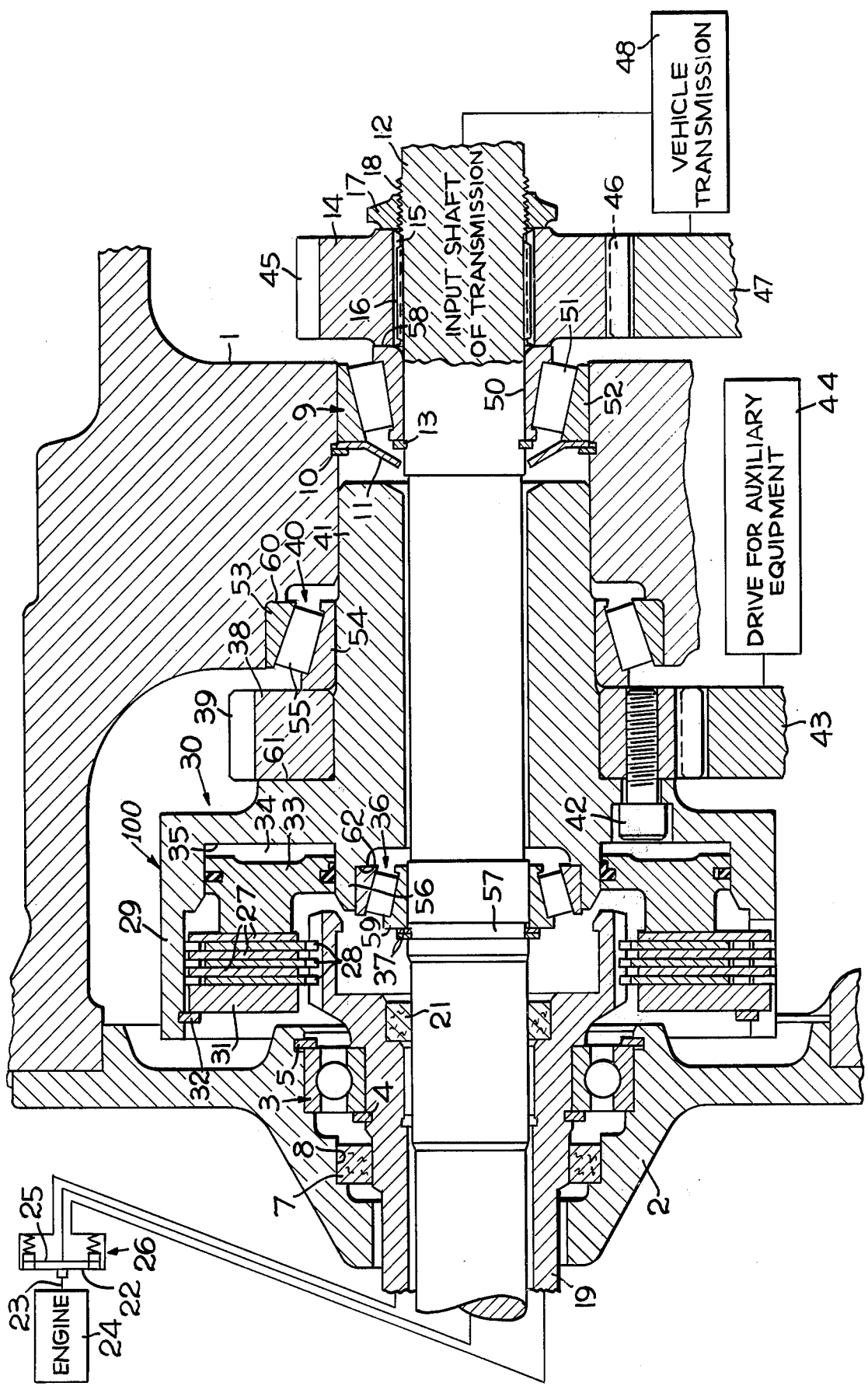

MULTIPLE BEARING ADJUSTING DEVICE

This invention relates to bearings for supporting a drive shaft and rotor and more particularly to a common adjusting means for a plurality of bearings rotatably supporting a plurality of rotating elements by providing predetermined axial dimensions on the rotating elements and bearings and supports to allow one adjustment to align all bearings simultaneously.

Helical gears used in a power transmission create axial thrusts due to the helical gear teeth and the axial thrust from the gears must be absorbed by the shafts and bearings. Tapered roller bearings are often used to absorb the thrust from the helical gears. Where a plurality of rotating elements including helical gears are mounted to rotate about a common center, more than one bearing must be used to support the shaft carrying the rotating elements within the housing. Accordingly, this invention provides for rotation of a rotor and gear and a shaft about a common axis of rotation. The shaft is rotatably mounted in a tapered roller bearing in the housing and carries a helical gear which produces an axial thrust against the bearing and the transmission housing. Similarly, another portion of the shaft is rotatably mounted in a bearing which is embraced by a rotor which, in turn, is rotatably mounted in a bearing in the housing. Accordingly, the shaft and the rotor rotate about a common axis. Tightening of the bearing which is mounted intermediate the rotor and the shaft simultaneously tightens the other two bearings to provide a common adjustment for all bearings to maintain alignment of the bearings for rotatably supporting the rotor and the shaft. The bearings used are tapered roller bearings which are conveniently assembled with the subassemblies of the transmission in the housing.

It is an object of this invention to provide a single adjustment for a plurality of bearings rotatably supporting a plurality of rotating elements.

It is another object of this invention to provide a bearing on a shaft rotatably supporting the shaft in a housing and a rotor bearing rotatably supporting a rotor in the housing and a bearing rotatably supporting said rotor and said shaft with a common adjustment for tightening all of the bearings by a single adjustment.

It is a further object of this invention to rotatably mount a shaft and a rotor on a plurality of bearings mounted in said housing and a bearing mounted intermediate said shaft and rotor and by controlling the axial dimension of the bearings positioned in the housing and the rotor to provide a single adjustment for tightening all bearings supporting the rotor and shaft.

The objects of this invention are accomplished by rotatably supporting a shaft and a rotor for rotation about a common axis. The axial dimensions of the bearings, the housing and the rotor have a total axial dimension equal to the dimension between bearing seats on the shaft to provide axial tightening of the bearings with a common axial adjustment on the shaft to maintain proper running adjustment of the plurality of tapered roller bearings.

Referring to the drawings, the preferred embodiment of this invention is illustrated.

The drawing illustrates a cross-section view of the bearings rotatably supporting the shaft and rotor together with a schematic illustration of the drive mechanism.

The drawing illustrates a transmission housing 1 with an end plate 2 fastened by suitable means to the transmission housing. The end plate 2 carries the bearing assembly 3 which is retained in position by the snap rings 4 and 5. A seal 7 positioned on the annular surface 8 seals the end of the bearing assembly.

The housing 1 similarly carries the tapered roller bearing assembly 9 rotatably supports shaft 12 and which is retained in position by the snap ring 10 engaging the shield 11. The bearing assembly 9 embraces the drive shaft 12 and engages the snap ring 13. The helical gear 14 is machined with a spline 15 on its inner periphery. The input shaft 12 is also provided with an external spline 16 which mates the spline 15 of the helical gear 14. The helical gear 14 is maintained in position by the nut 17 which threadedly engages the threaded portion 18 on the input shaft 12.

The clutch hub 19 is rotatably supported on bearing 3 in the cover 2 with a seal 21 provided between the clutch hub 19 and the input shaft 12.

The clutch hub 19 is fastened to the clutch plate 22 and rotates when the clutch plate is rotated by the drive shaft 23 which is connected to the engine 24. The clutch disc 25 is connected to the input shaft 12 and drives the input shaft when the clutch 26 is engaged.

The clutch hub 19 rotatably supported in bearing 3 carries a plurality of clutch discs 28. A plurality of clutch discs 27 are carried in the clutch drum 29 of rotor 100. The clutch assembly 30 includes the reaction plate 31 and the snap ring 32 retaining the reaction plate 31 in the clutch drum 29. The clutch is engaged by means of the piston 33 which forms the pressurizing chamber 34 with the cylinder 35 formed by the clutch drum 29. The rotor 100 forming the clutch drum 29 and sleeve portion 41 is rotatably mounted on the bearing assembly 36 also. The bearing assembly 36 embraces the input shaft 12 and is retained in this position by a plurality of shims 37 formed like snap rings. Shims 37 are formed of various thicknesses to provide adjustment for tightening.

The rotor 100 carries the helical gear 38. The helical teeth 39 create an axial thrust on the rotor bearing assembly 40. The bearing assembly 40 is mounted within the housing 1 and embraces the sleeve portion 41 of the rotor 100. The helical gear 39 is fastened by means of a plurality of bolts 42 of which one is shown and meshes with a driven helical gear 43. The driven helical gear is adapted for driving auxiliary equipment 44 which may be a hydraulic pump, a power take-off shaft, or provide a drive for any auxiliary equipment required on the vehicle.

The helical gear 14 is provided with helical teeth 45 which meshes with helical teeth 46 on a helical driven gear 47. The input shaft 12 drives the helical gear 14 which, in turn, drives the gear 47. The gear 47 is adapted for connection to drive through a gear range in the vehicle transmission 48. Similarly, the input shaft 12 may drive directly into the vehicle transmission 48 to provide a second speed range as desired. Any number of drive gears on the input shaft 12 may be provided to provide the desired speed ratios for the transmission. The input shaft 12 and the gear 14 are merely illustrative of the function of the transmission.

The operation of this transmission will be described in the following paragraphs.

The drive shaft 12 is received in the inner cone 50 and tapered rollers 51 of the bearing assembly 9. The snap ring 13 provides a limit for axial movement of the bearing cone 50 as the gear 14 is assembled on the input shaft 12. The nut 17 is then tightened and staked firmly in position as a subassembly for the transmission. The outer cone 52 of the bearing assembly 9 is positioned within the transmission housing and is seated in position by the snap ring 10 and shield 11 before the subassembly of the input shaft 12 is mounted in the transmission housing 1.

The bearing assembly 40 similarly is mounted within the housing. The outer cone 53 is mounted within the housing 1. The inner cone 54 and tapered rollers 55 are mounted on the clutch drum 29 of rotor 100 together with the helical gear 38 which is fastened by means of a plurality of bolts 42. The assembly including the clutch drum 29 is positioned within the housing 1 which receives the input shaft 12. The bearing assembly 36 is then mounted within the axial flange 56 in the drum 29. The shims 37 are selectively inserted in the annular recess 57 to tighten the bearing assemblies 36, 40 and 9 simultaneously. The number of shims 37 is determined by the axial spacing needed to tighten the bearing assemblies. In order that all three bearings are simultaneously tightened, the axial dimension through the shaft 2 must equal the total axial dimensions through the bearings and the housing and rotor 100 for proper operation. In other words, the dimension from the radial flange 58 on the bearing 9 through the shaft to the radial flange 59 of the bearing 36 must equal the total of the axial dimension through the bearing 9 and the axial dimension through the shield 11 to snap ring 10 and housing to the radial flange 60 of outer cone 53. Also included in the total axial dimension is the axial width through the bearing 40 and the width of the gear 39 as well as a thickness through the rotor from the facing 61 to the radial flange 62 and the axial width through the bearing 36. The total of these dimensions equals the axial dimension through the shaft and accordingly, when the shaft is pulled tight against the bearing assembly 9, the adjustment of bearing 36 tightens bearing assemblies 36, 40 and 9. Bearing 9 provides a reaction thrust against the helical gear 14 when in operation and similarly the bearing 40 provides a reaction thrust against the gear 38 when the transmission is in operation. The bearing 36 which embraces the drive shaft 12 rotatably mounts the shaft 12 within the clutch drum 29 which is rotatably mounted in the housing 1. Accordingly, the rotation of the clutch drum 29 and the rotation of the input shaft 12 is about a common axis of rotation.

The embodiments of the invention in which an exclusive property or privilege is claimed are defined as follows:

1. A multiple bearing adjustment for a vehicle transmission comprising, a transmission housing, a shaft, a shaft bearing mounted in said housing rotatably supporting said shaft for rotation about an axis, a bearing stop in said housing limiting the axial movement of said bearing in a first direction, means locking said bearing in fixed relation on said shaft, a rotor, a rotor bearing mounted in said housing rotatably supporting said rotor for rotation about a common axis with said shaft, a shaft and rotor bearing mounted between said shaft and said rotor permitting relative rotation between said shaft and said rotor, an adjustable stop mounted on said shaft firmly seating said shaft and rotor bearing axially to provide a simultaneous adjustment for all of the bearings in said transmission.

2. A multiple bearing adjustment in a vehicle transmission as set forth in claim 1 including a snap ring mounted on said shaft limiting axial movement of said shaft bearing in the first direction, a nut for tightening said shaft bearing on said shaft against movement in the second direction.

3. A multiple bearing adjustment for a vehicle transmission as set forth in claim 2 including a snap ring in said housing limiting axial movement of said shaft bearing in the first direction.

4. A multiple bearing assembly in a vehicle transmission as set forth in claim 3 wherein said adjustable stop includes a plurality of shims defining snap rings positioned on said shaft limiting axial movement of said shaft and rotor bearing in the second direction to adjust said plurality of bearings.

5. A multiple bearing adjustment in a vehicle transmission as set forth in claim 1 wherein said shaft defines an input shaft for said vehicle transmission.

6. A multiple bearing adjustment in a vehicle transmission as set forth in claim 1 wherein said rotor includes a clutch drum and drive gear.

7. A multiple bearing adjustment in a vehicle transmission as set forth in claim 1 wherein said bearings define tapered roller bearings.

8. A multiple bearing adjustment in a vehicle transmission as set forth in claim 1 including a gear fixed to said shaft operating as said bearing stop.

9. A multiple bearing adjustment in a vehicle transmission as set forth in claim 1 wherein said rotor defines a recess receiving said shaft and rotor bearing.

10. A multiple bearing adjustment in a vehicle transmission as set forth in claim 1 including a helical drive gear, means for mounting said helical drive gear for rotation with said shaft, annular recess formed in said rotor to receive said shaft and rotor bearing to provide adjustment of said three bearings simultaneously whereby the axial dimension from the first bearing to the third bearing through said shaft is equal to the total of axial dimensions through said three bearings and said housing and said rotor to provide simultaneous adjustment of all bearings.

* * * * *